Figure 1:
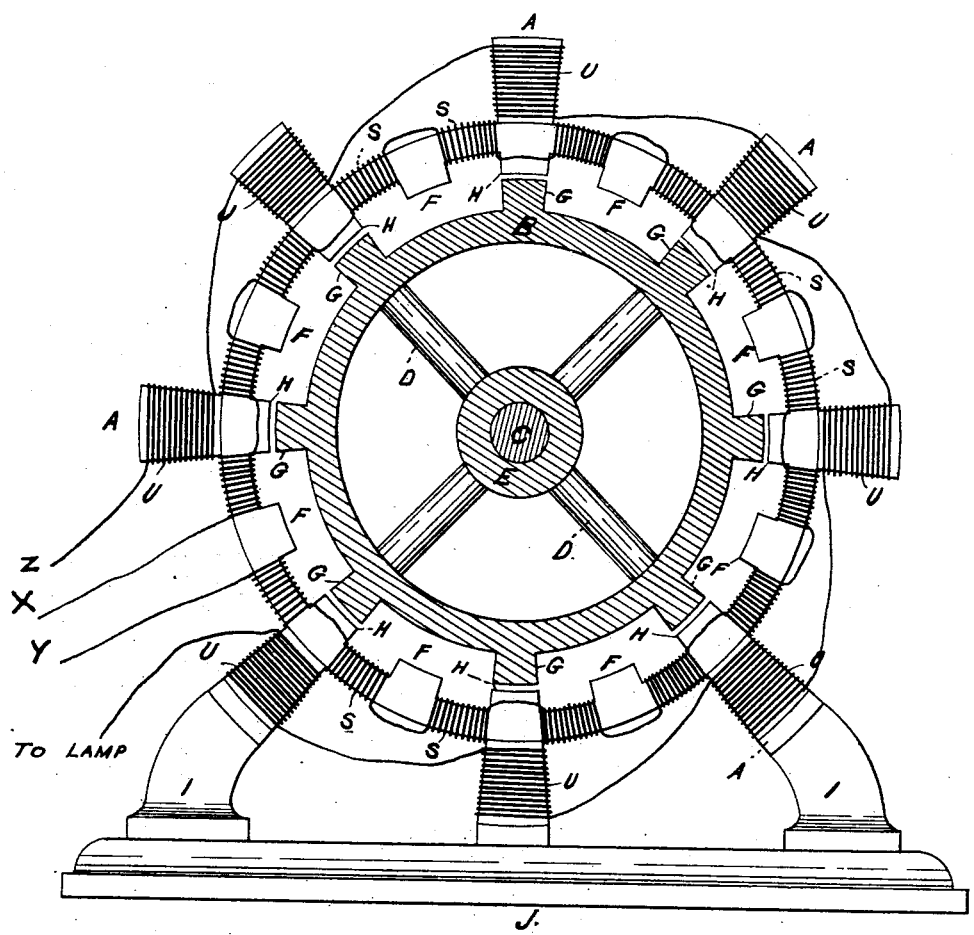

2 Sheets—Sheet 1.

W. E. SAWYER.
Dynamo-Electric Machine.

No. 237,632. Patented Feb. 8, 1881.

WITNESSES.

INVENTOR.

2 Sheets—Sheet 2.
W. E. SAWYER.
Dynamo-Electric Machine.
No. 237,632. Patented Feb. 8, 1881.
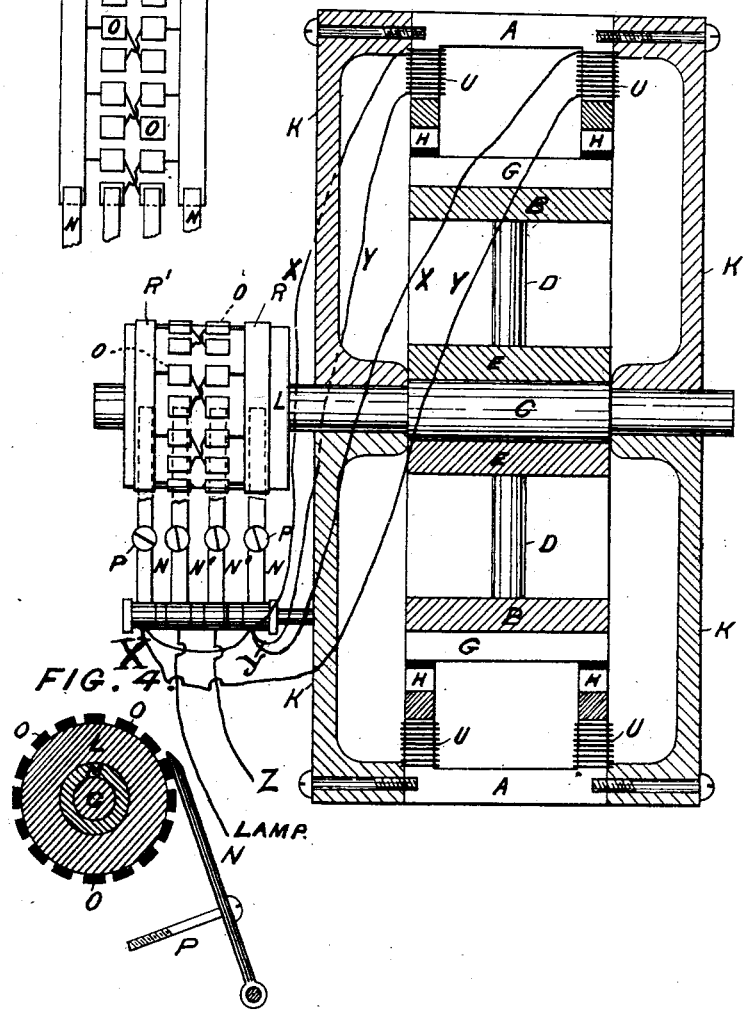

UNITED STATES PATENT OFFICE.

WILLIAM E. SAWYER, OF NEW YORK, N. Y., ASSIGNOR TO ELECTRO DYNAMIC LIGHT COMPANY, OF NEW YORK.

DYNAMO-ELECTRIC MACHINE.

SPECIFICATION forming part of Letters Patent No. 237,632, dated February 8, 1881.

Application filed December 20, 1878.

*To all whom it may concern:*

Be it known that I, WILLIAM EDWARD SAWYER, of the city, county, and State of New York, have invented a new and Improved Dynamo-Electric Machine, of which the following is a description in such full, clear, concise, and exact terms as to enable any person skilled in the art or science to which it appertains or with which it is most nearly connected to make and use the same, reference being had to the drawings accompanying and making part of this specification, and to the letters and figures of reference marked thereon, as hereinafter described.

The object of this invention is to simplify the construction, increase the efficiency, and decrease the resistance and heat of the dynamo-electric generating-machine.

Said invention consists, first, of a generator of electricity operating through the increasing and decreasing magnetism in the magnets by the approach and recession to and from the magnets of paramagnetic armatures; second, of a generator operating by the shifting of the magnetic force from and into different parts of the magnets; third, of a generator in which only the magnets are wound with the conducting-wire, thus avoiding the retarding effects which take place when both magnets and armatures are wound, as in the case of other dynamo-electric machines employed for electric lighting and electrolysis.

Reference being had to the drawings, Figure 1 is a side elevation of the generator with the disk K removed. Fig. 2 is a transverse vertical section through the same. Fig. 3 is a view of the annexed commutator developed, and Fig. 4 is an end view of the commutator wrapped around a rotating drum annexed to the generator.

The generator consists, substantially, of the following principal parts:

First, of two rings, (shown in Figs. 1 and 2 of the drawings by H H.) To these rings are fitted a series of electro-magnets or permanent magnets, A A A, projecting inward in the manner shown, the north pole of each magnet being connected to one of said rings, and the south pole to the other. One ring is therefore the north pole and the other the south pole of the entire machine.

Second, of two flanges or disks, K K, bolted to the magnets A, by which said rings and magnets are held in position around a center common to themselves, and the disks K, which are supported and held by legs I I, bolted to any suitable frame.

Third, of a barrel or cylinder, B, fitted with armatures G. This cylinder or barrel, with its armatures, rotates upon the center shaft, C, fitted into and carried by the hubs of the flanges K, the periphery or shell of the cylinder being supported by spokes D, as shown in the drawings.

The rings H are provided with projections F, arranged upon a common circle with the lower ends of the magnets, and between these projections and the poles of the magnets proper are coils of wire, S, creating an electro-magnet on the ring each side of the magnets A, the ring being thus converted into a succession of electro-magnets over the armatures G, which are, of course, arranged to swing clear of the projections F and the lower ends of the magnets A.

The operation is as follows: If A A are electro-magnets, as shown by the drawings, they will contain a slight residual magnetism. The armatures G, being in the position shown, satisfy the magnetic attraction of the magnets, and little or no magnetic force exists in the intermediate parts of the rings H, which are embraced by S F S. Now, as the armatures G come opposite the projections F on the rings, these projections become the poles of the magnets, and the magnetic force thus sent into the interior of the coils S generates currents in these coils, which, being thrown by the commutator around the magnets A through the coils U, in the well-known manner, further magnetize them, until finally they are magnetized to saturation by the well-known process of accumulation.

The commutator shown by Figs. 2, 3, and 4 consists of two rows of insulated pieces, O O, connected interchangingly, as shown by Figs. 2 and 3. These pieces are fixed to an insulating-drum, L, fitted on the sleeve M, carried by the shaft C. Upon this drum L are fitted two insulated rings, R R, connected to the pieces O O, as shown by Figs. 2 and 3 of the drawings, and upon the rings R and pieces O ride four springs, N N and N' N'. Now, the coils S are wound alternately in opposite directions, to accord with the winding of the magnet-coils U, and all the coils S form one conductor, the two ends of which (shown by X Y) are connected electrically to the two outside springs, N N. The current in these coils is set straight by the two inner springs, N' N', being upon the pieces O. To one of these springs, N', the external conductor, Z, is connected, and to the other spring, N, is connected one end of the conductor, which constitutes and leads from all the coils U. The other end of the wire constituting the coils U forms the other pole of the external conductor, in which is placed the electric light or other apparatus to be worked. The tension of the springs N and N' is adjusted by the screws P, substantially as shown by the drawings.

In concluding this description of my invention, I desire to say that I do not intend to limit the patent of which this specification is to be a part to any particular form of the invention or any part thereof, but intend to claim the principle or substance of that form—that is to say:

I claim—

1. A dynamo-electric generating-machine constructed of stationary magnets, in which the magnetic force is continuous, such magnets being surrounded with conducting-coils, in combination with a rotating barrel of unwound armatures, as distinguished from the stationary magnets, and rotating barrel of armatures of electro-magnetic engines, in which the magnets are energized intermittently to produce motion.

2. The combination of the magnets A S F, connected and operating substantially as described.

3. The two rings H H, connected by magnets and operating substantially as described.

4. The combination of magnets A, rings H, and armatures G, operating substantially as described.

5. The combination of a series of contiguous magnets, A, with a series of intervening sections of iron, joining their poles over a rotating armature, substantially as described, for the purpose of inducing and accumulating their magnetic force, substantially as set forth.

6. A dynamo-electric generating-machine consisting of united rings fitted with a succession of electro-magnets, and combined with a succession of armatures rotating about a center common to themselves, and the series of magnets.

7. In a dynamo-electric machine, a succession of electro-magnets fitted and connected upon stationary rims or rings, and energized by a succession of unwound armatures rotating within the rims carrying the magnets.

Dated December 16, 1878.

WILLIAM EDWARD SAWYER.

Witnesses:
AMOS BROADNAX,
W. H. BROADNAX.